June 25, 1929.  P. H. QUALMANN  1,718,432
BIRD CAGE ACCESSORY
Filed March 2, 1929
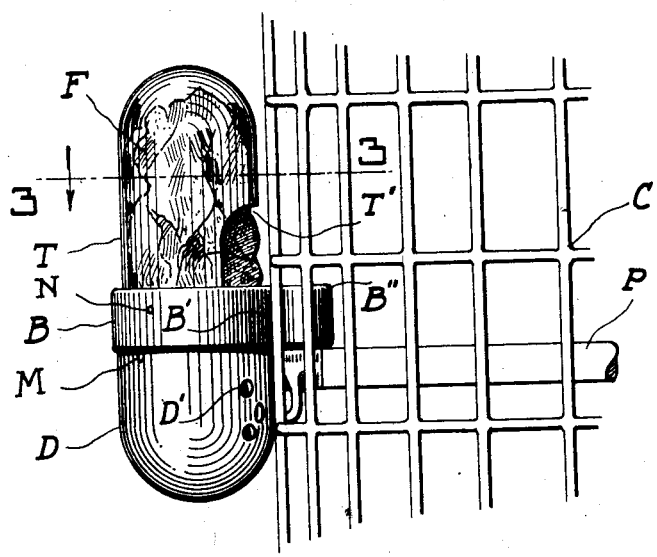
FIG. 1.
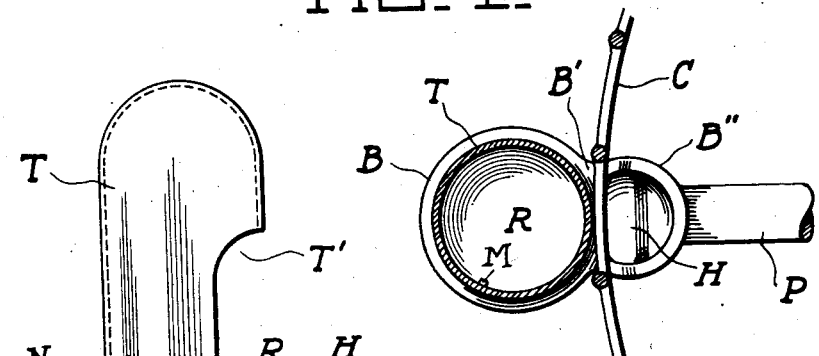
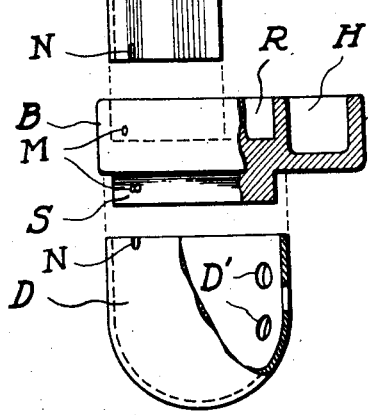
FIG. 2.
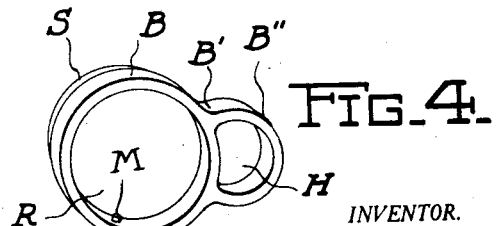
FIG. 3.
FIG. 4.
INVENTOR.
Paul H. Qualmann.
BY
ATTORNEY.

Patented June 25, 1929.

1,718,432

UNITED STATES PATENT OFFICE.

PAUL H. QUALMANN, OF MILWAUKEE, WISCONSIN.

BIRD-CAGE ACCESSORY.

Application filed March 2, 1929. Serial No. 344,066.

This invention relates to bird-cage attachments employed as feeding adjuncts and such purposes which are intended for insuring the health and well-being of captive pets of the canary or like variety.

The objects of the invention are: The assembling into one unit several containers necessary in bird-cage furnishings. The economical designing of an assembly that will reach the ultimate purchaser at a reasonable charge. The providing of a singular fixture which, upon replenishing one provision, will very naturally direct attention to the other essentials which should be, at the same time, renewed. The fashioning of several container apartments that will permit easy removal, cleaning, et cetera while presenting the appearance of but one attachment whose condition of requirement for replenishing may be seen through a transparent choice of material selected. The providing of a central element that is rigidly held between the cage bars which offers the support of other adjuncts attached thereto that complete the invention aforesaid. And the providing of a container means which will minimize the scattering propensities of pets, of the kind concerned, while feeding.

The drawing comprises four figures, indexed as follows:

Figure 1 is a view showing the application of the invention.

Figure 2 is a sectional view showing the several elements adjacently separated.

Figure 3 is a section on line 3—3 of Fig. 1.

Figure 4 is a perspective view of the central or base element.

Similar characters of reference apply to like parts throughout the several views.

Referring to the drawing:—The invention is attached to a cage C where the perch P will occur beneath an inwardly projected portion, leaving the assembly within easy reach of the captive occupant.

Referring more particularly to the figures, B is a central base element providing a reduced neck portion B', from which extends an integral bowl container B''; the latter combined with the base B has a figure-8 plan aspect which allows the bars of the cage C to expand about the bowl B'' and contract again about the neck B', which fact, with the perch P under the said bowl, offers a substantial anchorage for the aforesaid base member B. The portion B'' is scooped out at H to hold small quantities of conditioning seeds generally provided birds of the singing variety, or other delicacies common to the care and upkeep of feathered pets. The portion B is concentrically bored to provide a recess R into which is pressed the incompleted end of a closed transparent tubular container T, the said container being adapted to hold, visibly, certain food products F such as bacon, apple portions, etc., which are accessible to the cage occupant through an opening T' formed by the aforesaid incompleted end of the tube T. This food will be in addition to the regulation seed for birds held in the customary containers not shown in this instance, the said food being intended as an occasional diversion, but necessary nevertheless for keeping in condition captive creatures of the kind here concerned. Depended from the base B is a similar tube D which fits over a reduced annulus S. The latter tube D will, however, be opaque in order to provide a darkened chamber within this tube, which chamber will, at times, be stuffed with cotton, while, at other periods the chamber will contain some suitable disinfectant; the latter acting as a fumigant during certain seasons while the former serving as a breeding nest for bird vermin that is attracted to a product of a cotton variety. The said vermin enters through apertures D', and the said cotton will be easily removed and destroyed in any sanitary way.

Both elements, T and D will be made of waterproof material for allowing frequent immersion for cleansing same. The transparent feature of the tube T, considering the custom of hanging bird-cages adjacent windows, leaves the replenishing obligation easily seen. The advantage of employing a tubular formation, made of product other than screen fabric, prevents the bird from getting at the contents except through the opening T', thereby minimizing the chances of scattering refuse outside the cage limits. Being somewhat restricted in the acquiring of food in the manner arranged, is an incentive to partake of more of the variety provided in smaller quantities, which is an intentional, as well as a beneficial consideration.

The tubes T and D are notched similarly at N to register with the nubs or dowels M, so that in returning either to the base B, the apertures D' and the opening T' will always face the cage's interior and lock said tubes from turning away therefrom.

Having described the invention, what is desired of protection by Letters Patent, is:—

1. A bird cage accessory having, a central base element positioned within and without said cage and held thereat by the bars of said cage, a transparent tube-like chamber supported immovably by said base, an opaque tube-like chamber depended immovably from said base, both said chambers arranged concentrically and vertically aligned to register with the plan and elevation of the outwardly positioned portion respectively of the aforesaid base.

2. A bird cage accessory having, a centrally disposed base element frictionally held by cage bars, an outward portion of said base formed to offer a bore, a downward projection from said base concentric to said bore, oppositely arranged container elements concentric with said bore and said projection, means surrounding one of said elements to frictionally hold same in place, and frictional means residing in the connection of the other element to complete the unity of the aforesaid accessory.

3. A bird cage accessory having, a food compartment opening into said cage; a disinfectant compartment opening into said cage; a base member uniting said compartments and dividing said compartments from one another to form the accessory aforesaid; and an extended portion of said member functioning as an abutting ledge, a container, and an enlargment for retaining said accessory against the bars of the said cage.

In testimony of which I hereunto affix my signature.

PAUL H. QUALMANN.